(12) United States Patent
Aguilar

(10) Patent No.: US 7,258,380 B1
(45) Date of Patent: Aug. 21, 2007

(54) COLLAPSIBLE PICKUP BED RACK APPARATUS

(76) Inventor: Juan A. Aguilar, 1608 Henry Long Blvd., Stockton, CA (US) 95026

( * ) Notice: Subject to any disclaimer, the term of this patent is extended or adjusted under 35 U.S.C. 154(b) by 0 days.

(21) Appl. No.: 11/350,379

(22) Filed: Feb. 9, 2006

(51) Int. Cl.
*B60P 3/00* (2006.01)

(52) U.S. Cl. ....................................... 296/3

(58) Field of Classification Search ............ 296/3; 224/405
See application file for complete search history.

(56) References Cited

U.S. PATENT DOCUMENTS

| | | | | |
|---|---|---|---|---|
| 2,692,795 | A * | 10/1954 | Lander | 296/102 |
| 4,211,448 | A * | 7/1980 | Weston | 296/3 |
| 4,659,131 | A | 4/1987 | Flournoy, Jr. | |
| 4,676,543 | A * | 6/1987 | Lewis | 296/3 |
| 4,770,458 | A * | 9/1988 | Burke et al. | 296/3 |
| 5,037,152 | A | 8/1991 | Hendricks | |
| 5,108,141 | A * | 4/1992 | Anderson | 296/3 |
| 5,152,570 | A * | 10/1992 | Hood | 296/3 |
| 5,692,791 | A * | 12/1997 | Sulzer | 296/3 |
| D436,915 | S | 1/2001 | Burger | |
| 6,186,571 | B1 * | 2/2001 | Burke | 296/3 |
| 6,209,944 | B1 * | 4/2001 | Billiu et al. | 296/100.02 |
| 6,332,637 | B1 | 12/2001 | Chambers | |
| 6,666,490 | B1 * | 12/2003 | Thacker | 296/26.07 |
| 6,752,301 | B1 | 6/2004 | Drolet | |
| 6,758,508 | B2 | 7/2004 | Weyhrich | |
| 2002/0036412 | A1 * | 3/2002 | Bareket | 296/3 |
| 2005/0238454 | A1 * | 10/2005 | Zuniga | 410/96 |
| 2006/0017303 | A1 * | 1/2006 | Weege et al. | 296/105 |

* cited by examiner

*Primary Examiner*—Kiran B. Patel

(57) ABSTRACT

A collapsible pickup bed rack apparatus includes a frame having a first side member, a second side member and an end member attached to first ends of the first and second end members. A perimeter flange attached to an upper edge of the frame is positionable on an upper edge of a pickup bed's perimeter wall. Brackets are attached to the first and second side members adjacent to the end member. A rear support includes a pair of vertical posts each having a bottom end and a top end. A horizontal post is attached to the vertical posts. A front support includes a pair of vertical rods each having a lower end and an upper end. A horizontal rod is attached to the vertical rods. A plurality of couplers releasably couples the front support to the brackets and rear supports to the frame adjacent to the second ends.

14 Claims, 6 Drawing Sheets

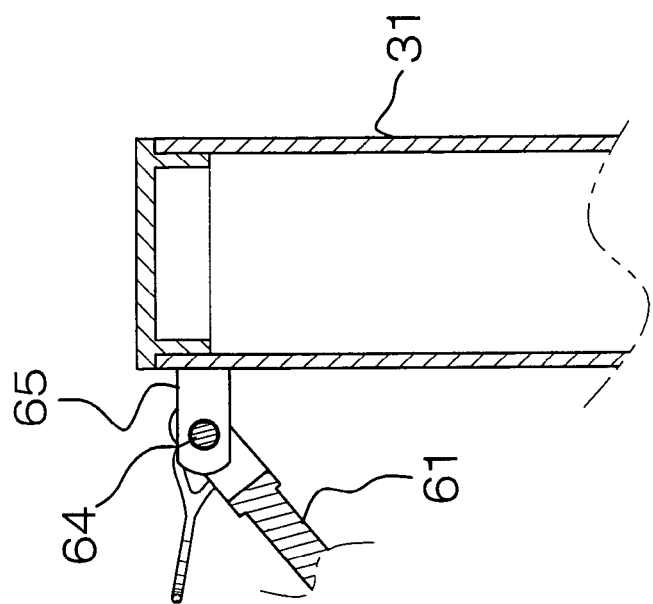
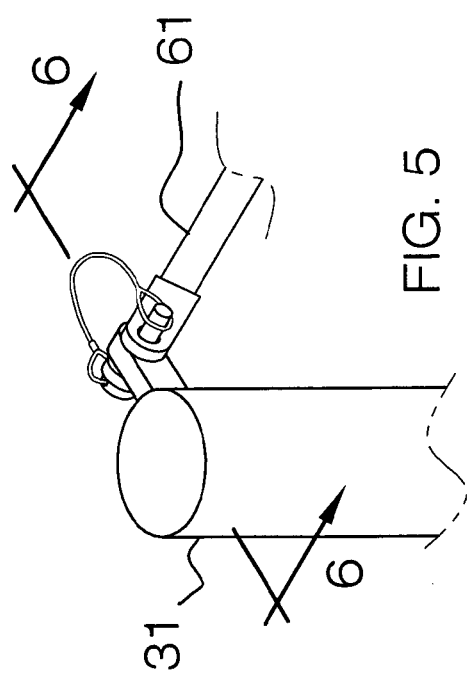
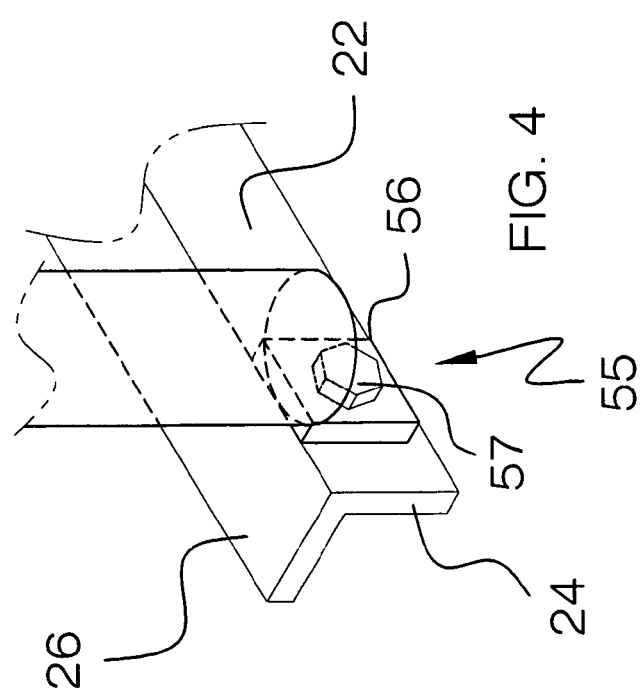
FIG. 6
FIG. 5
FIG. 4

COLLAPSIBLE PICKUP BED RACK APPARATUS

BACKGROUND OF THE INVENTION

1. Field of the Invention

The present invention relates to rack devices and more particularly pertains to a new rack device for positioning on a perimeter wall attached to a pickup bed for providing a support area for tools, recreational devices, and the like, and which may be readily disassembled when not in use.

2. Description of the Prior Art

The use of rack devices is known in the prior art. U.S. Pat. No. 6,752,301 describes a collapsible rack device that is configured for use in pickup beds. Another type of rack device is U.S. Pat. No. 5,037,152 that is configured for being attached to the side walls of a pickup bed and includes telescopic arms that extend upwardly from the pickup bed. Another rack device for a pickup truck is found in U.S. Pat. No. 6,758,508 that includes a frame configured for fitting within a pickup bed and which may be readily collapsed when not in use. Still yet another such device is found in U.S. Pat. No. 6,332,637.

While these devices fulfill their respective, particular objectives and requirements, the need remains for a device that is positionable on an upper edge of a perimeter wall attached to a pickup bed and extends along the length of the perimeter wall to prevent accidental shifting of the device. The device should include easily removable supports that are attachable to and extend upwardly from the device. Further, the supports should have a shape to encourage the retention of supported items in such a manner that they remain within a perimeter of the truck.

SUMMARY OF THE INVENTION

The present invention meets the needs presented above by generally comprising a frame having a first side member and a second side member each having a first end and a second end. An end member is attached to and extends between the first ends of the first and second side members. The first and second side members are orientated parallel to each other. A perimeter flange is attached to and extends outwardly from an upper edge of the frame. The flange is positionable on an upper edge of a pickup bed's perimeter wall. Each of a pair of brackets is attached to and extends upwardly from one of the first and second side members adjacent to the end member. A rear support includes a pair of vertical posts each having a bottom end and a top end. A horizontal post is attached to and extending between the vertical posts. A front support includes a pair of vertical rods each having a lower end and an upper end. A horizontal rod is attached to and extends between the vertical rods. A plurality of couplers releasably couple the front and rear supports to the frame so that the front support is attached to the brackets and the rear support is positioned adjacent to the second ends.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is an enlarged perspective view of a coupler of the present invention.

FIG. 5 is an enlarged perspective view of a brace of the present invention.

FIG. 6 is a cross-sectional view taken along line 6-6 of FIG. 5 of the present invention.

DESCRIPTION OF THE PREFERRED EMBODIMENT

Figure 1:
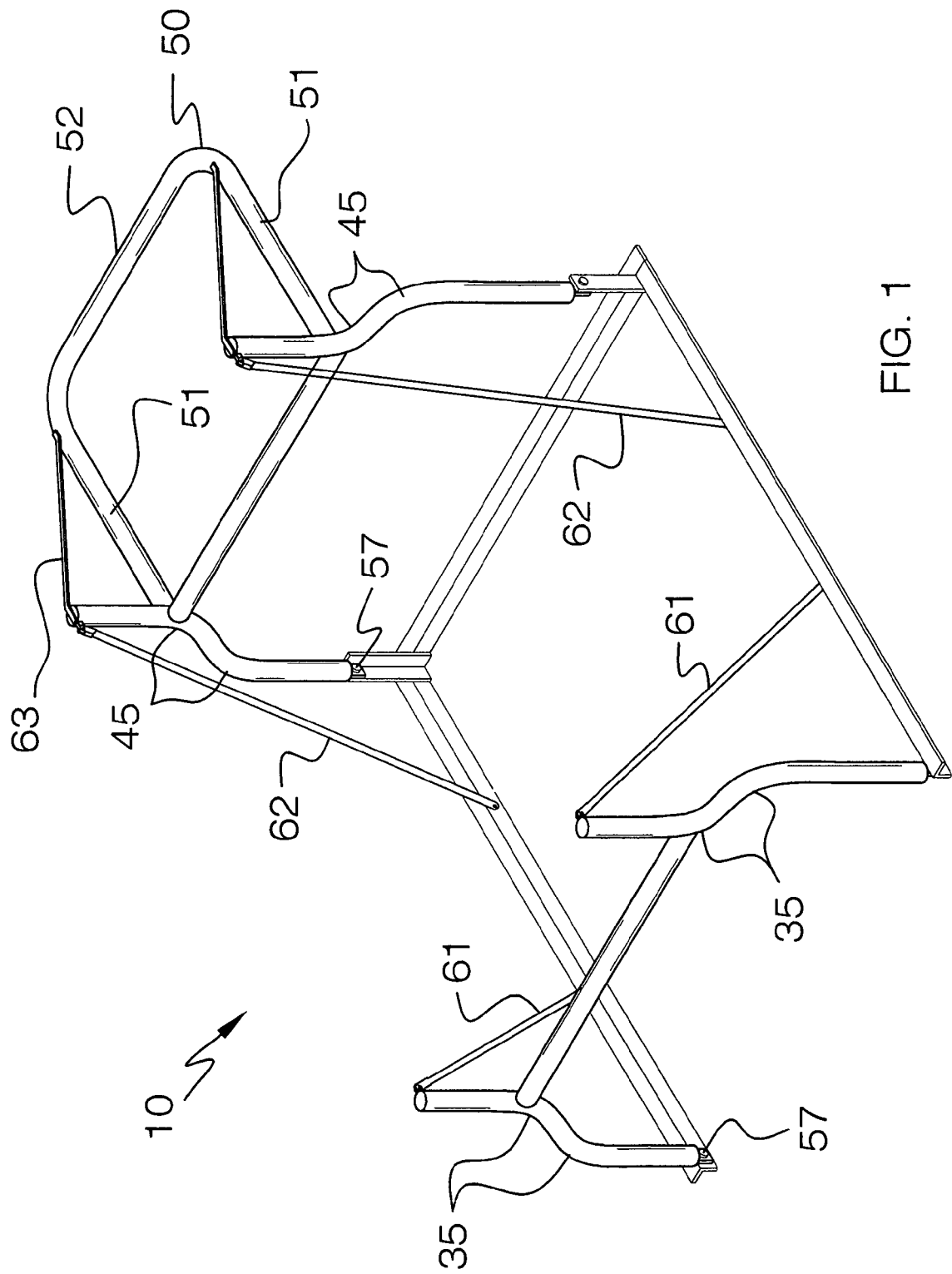
FIG. 1 is a perspective view of a collapsible pickup bed rack apparatus according to the present invention.
Figure 2:
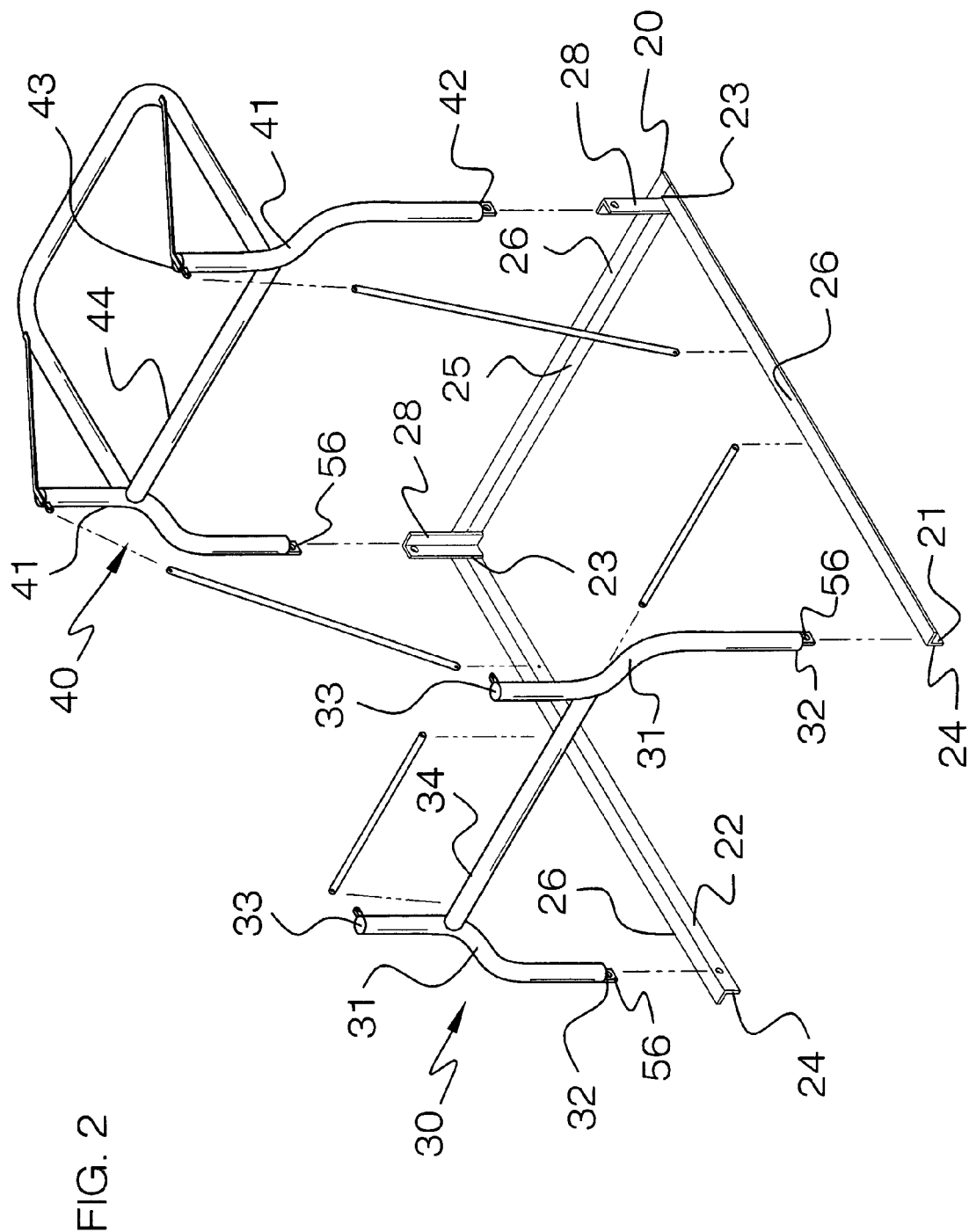
FIG. 2 is an expanded perspective view of the present invention.
Figure 3:
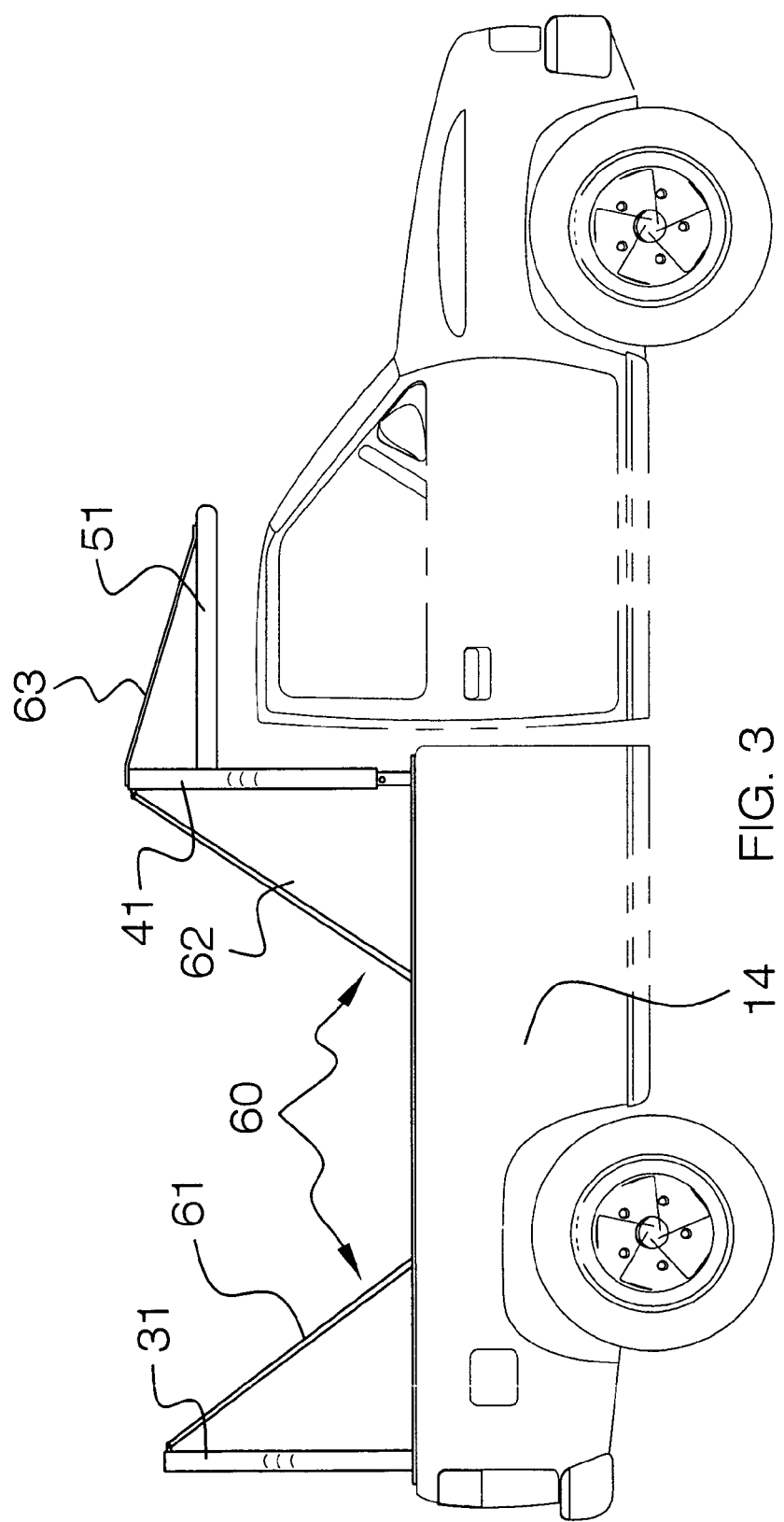
FIG. 3 is a side in-use view of the present invention.

With reference now to the drawings, and in particular to FIGS. 1 through 8 thereof, a new rack device embodying the principles and concepts of the present invention and generally designated by the reference numeral 10 will be described.

As best illustrated in FIGS. 1 through 8, the collapsible pickup bed rack apparatus 10 generally comprises an apparatus for mounting on an upper edge 12 of a perimeter wall 14 attached to a pickup bed 16. The assembly includes a frame 20 having a first side member 21 and a second side member 22 each having a first end 23 and a second end 24. An end member 25 is attached to and extends between the first ends 23 of the first 21 and second 22 side members. The first 21 and second 22 side members are orientated parallel to each other so that the frame 20 is U-shaped like the upper edge 12 of a conventional pickup bed perimeter wall 14. A perimeter flange 26 is attached to and extends outwardly from an upper edge of the frame 20. The flange 26 is positionable on the upper edge 12 of the pickup bed's perimeter wall 14. A pair of brackets 28 is provided. Each of the brackets 28 is attached to and extends upwardly from one of the first 21 and second 22 side members adjacent to the end member 25.

A rear support 30 includes a pair of vertical posts 31 each having a bottom end 32 and a top end 33. A horizontal post 34 is attached to and extends between the vertical posts 31. The horizontal post 34 is positioned nearer to the top ends 33 than the bottom ends 32. Each of the vertical posts 31 has a pair of bends 35 therein so that a distance between the top ends 33 is less than a distance between the bottom ends 32. An upper portion of the vertical posts positioned between the top ends 33 and the bends 35 is vertically orientated when a lower portion of the vertical posts positioned between the bottom ends 32 and the bends 35 is vertically orientated.

A front support 40 includes a pair of vertical rods 41 each having a lower end 42 and an upper end 43. A horizontal rod 44 is attached to and extends between the vertical rods 41. The horizontal rod 44 is positioned nearer to the upper ends 43 than the lower ends 42. Each of the vertical rods 41 has a pair of bends 45 therein so that a distance between the upper ends 43 is less than a distance between the lower ends 42. An upper portion of the vertical rods 41 positioned between the upper ends 43 and the bends 45 is vertically orientated when a lower portion of the vertical rods 41 positioned between the lower ends 42 and the bends 45 is vertically orientated. The front 40 and rear 30 supports have generally the same shape and size.

A horizontal support 50 is attached to the front support 40 and is horizontally orientated when the front support 40 is vertically orientated. The horizontal support 50 includes a pair of arms 51. Each of the arms 51 is attached to one of the vertical rods 41 adjacent to the upper ends. The arms 51 each have a distal end with respect to the vertical rods 41. A central member 52 is attached to and extends between the distal ends of the arms 51. The arms 51 are orientated parallel to each other.

A plurality of couplers 55 are provided and are configured to releasably couple the front 40 and rear 30 supports to the frame 20 so that the front support 40 is attached to the brackets 28 and the rear support 30 is positioned adjacent to the second ends 24. Each of the couplers 55 includes a plate 56 and a fastener 57. Each of the plates 56 is attached to one of the bottom 32 and lower 42 ends. Each of two of the fasteners 57 is removably extendable through one of the plates 56 attached to one of the bottom ends 32 and into one of the first 21 and second 22 side members adjacent to the second ends 24. Each of two of the fasteners 57 is removably extendable through one of the plates 56 attached to the lower ends 42 and into one of the brackets 28.

A plurality of braces 60 is also provided. Each of the braces 60 is elongated and each of the braces 60 is removably attached to and extends between one of the front 40 and rear 30 supports and the frame 20. The plurality of braces 60 includes a first pair of braces 61. Each of the braces 60 of the first pair of braces 61 is attached to one of the vertical posts 31. The plurality of braces 60 also includes a second pair of braces 62. Each of the braces 60 of the second pair of braces 62 is attached to one of the vertical rods 41. The braces 60 are each angled with respect to a horizontal plane generally between 20 degrees and 70 degrees. A second set of braces 63 may be attached to and extended between the front support 40 and the horizontal support 50. The first 61 and second 62 pairs of braces are preferably attached to the respective front 40 and rear 30 supports with a pin 64 extendable through a nub 65 and through the ends of the associated braces 60 to allow for easy removal and collapsibility of the front 40 and rear 30 supports.

Figure 7:
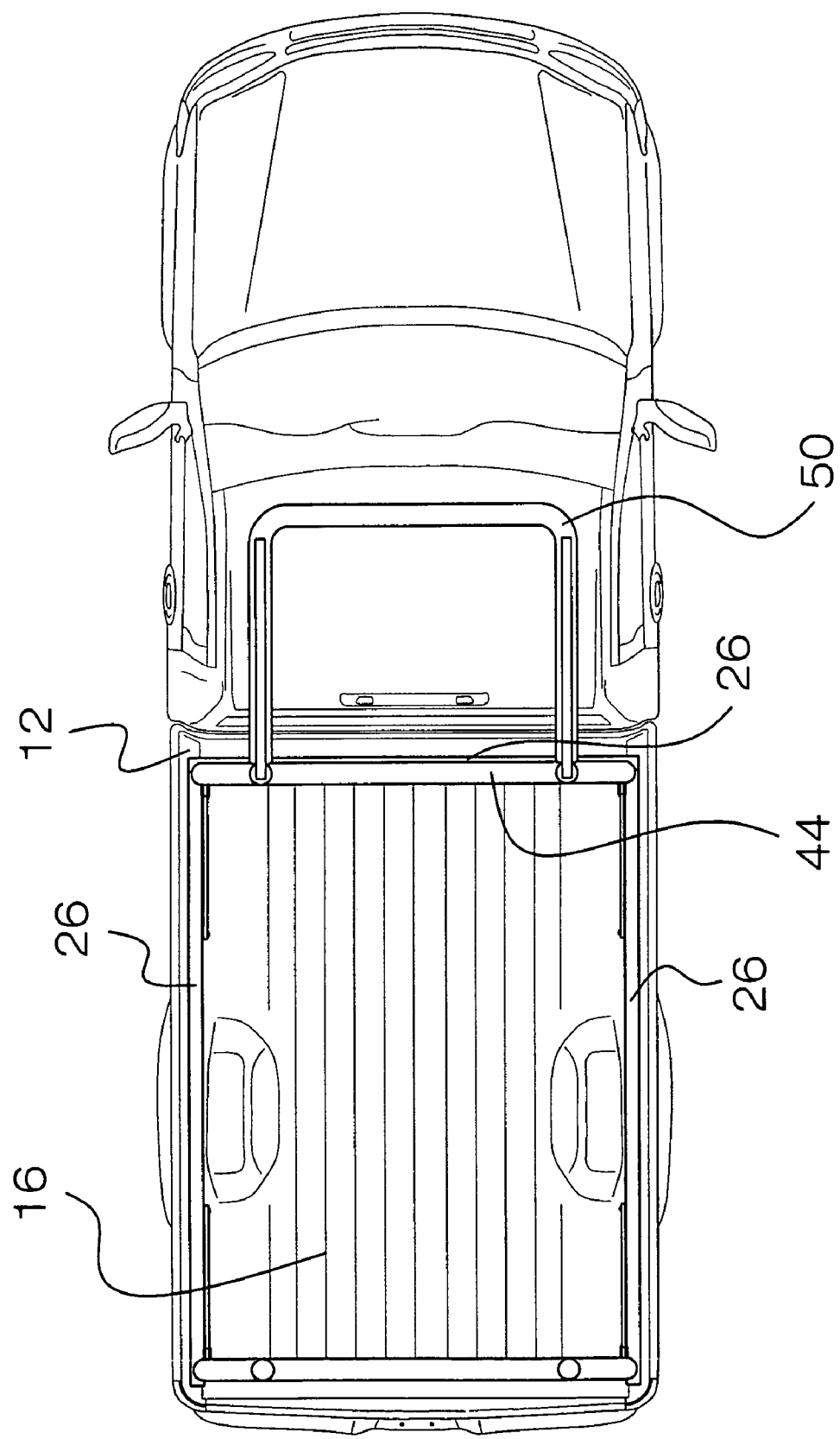
FIG. 7 is a top in-use view of the present invention.
Figure 8:
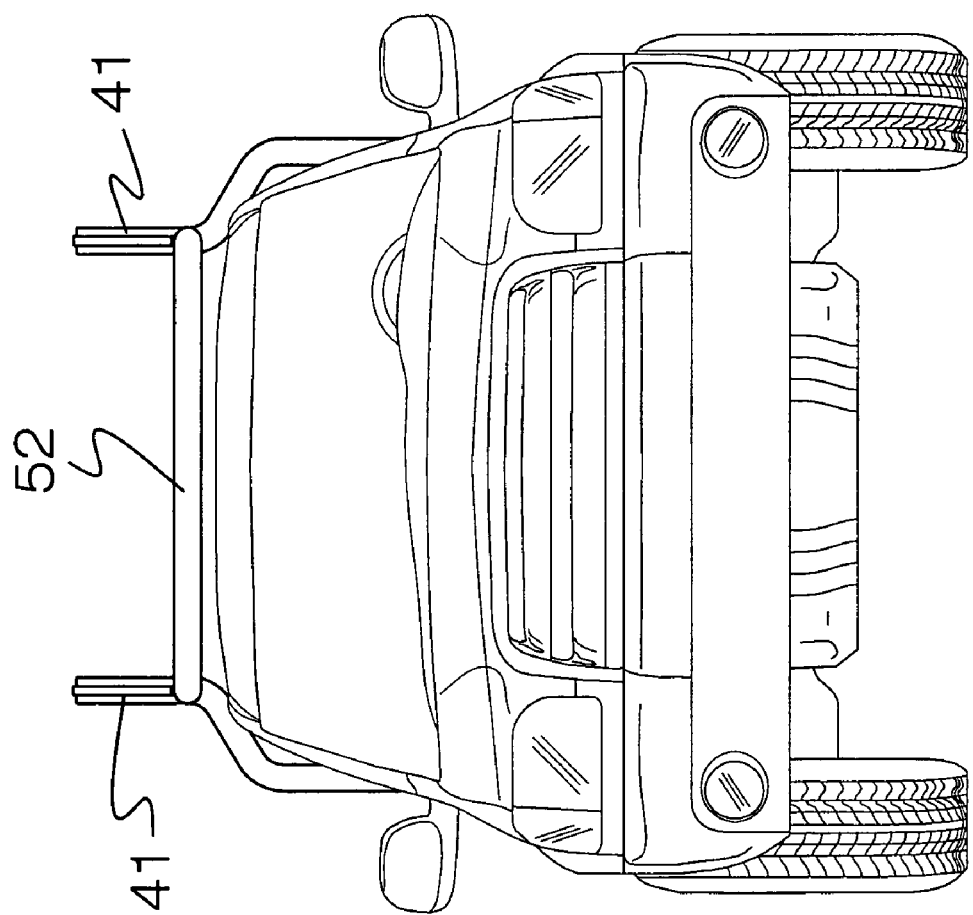
FIG. 8 is a front in-use view of the present invention.

In use, the frame 20 is positioned on the upper edge of 12 the perimeter wall 14 as shown in FIG. 7. The flange 26 prevents the frame 20 from moving off of the upper edge 14. The front 40 and rear 30 supports are then mounted as needed on the frame 20. The braces 60 are added to provide additional support for the front 40 and rear 30 supports. The vertical posts 31 and vertical 41 rods are bent and angled inward to assist a person in retaining articles within the truck bed area and not extending laterally away from the truck bed 16. When not in use, the front 40 and rear 30 supports may be removed and placed in the pickup bed 16 or simply pivoted downward into the pickup bed 16.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A collapsible truck rack assembly for mounting on an upper edge of a perimeter wall attached to a pickup bed, said assembly including:

a frame including a first side member and a second side member each having a first end and a second end, an end member being attached to and extending between said first ends of said first and second side members, said first and second side members being orientated parallel to each other, a perimeter flange being attached to and extending outwardly from an upper edge of said frame, said flange being positionable on the upper edge of the perimeter wall, a pair of brackets, each of said brackets being attached to and extending upwardly from one of said first and second side members adjacent to said end member;

a rear support including a pair of vertical posts each having a bottom end and a top end, a horizontal post being attached to and extending between said vertical posts;

a front support including a pair of vertical rods each having a lower end and an upper end, a horizontal rod being attached to and extending between said vertical rods;

a horizontal support being attached to said front support and being horizontally orientated when said front support is vertically orientated; and a plurality of couplers configured to releasably couple said front and rear supports to said frame such that said front support is attached to said brackets and said rear support is positioned adjacent to said second ends.

2. The assembly according to claim 1, wherein said horizontal post is positioned nearer to said top ends than said bottom ends.

3. The assembly according to claim 2, wherein each of said vertical posts has a pair of bends therein so that a distance between said top ends is less than a distance between said bottom ends, an upper portion of said vertical posts positioned between said top ends and said bends being vertically orientated when a lower portion of said vertical posts positioned between said bottom ends and said bends is vertically orientated.

4. The assembly according to claim 2, said horizontal rod is positioned nearer to said upper ends than said lower ends.

5. The assembly according to claim 3, wherein said horizontal rod is positioned nearer to said upper ends than said lower ends.

6. The assembly according to claim 5, wherein each of said vertical rods has a pair of bends therein such that a distance between said upper ends is less than a distance between said lower ends, an upper portion of said vertical rods positioned between said upper ends and said bends being vertically orientated when a lower portion of said vertical rods positioned between said lower ends and said bends is vertically orientated.

7. The assembly according to claim 5, further including a horizontal support being attached to said front support and being horizontally orientated when said front support is vertically orientated.

8. The assembly according to claim 7, wherein said horizontal support includes a pair of arms, each of said arms being attached to one of said vertical rods adjacent to said upper ends, each of said arms having a distal end with respect to said vertical rods, a central member being attached to and extending between said distal ends of said arms, said arms being orientated parallel to each other.

9. The assembly according to claim 1, wherein said horizontal support includes a pair of arms, each of said arms being attached to one of said vertical rods adjacent to said upper ends, each of said arms having a distal end with respect to said vertical rods, a central member being attached to and extending between said distal ends of said arms, said arms being orientated parallel to each other.

10. The assembly according to claim 1, wherein each of said couplers includes a plate and a fastener, each of said plates being attached to one of said bottom and lower ends, each of two of said fasteners being removably extendable through one of said plates attached to one of said bottom end and into one of said first and second side members adjacent to said second ends, each of two of said fasteners being removably extendable through one of said plates attached to said lower ends and into one of said brackets.

11. The assembly according to claim 10, further including a plurality of braces, each of said braces being elongated, each of said braces being removably attached to and extending between one of said front and rear supports and said frame.

12. The assembly according to claim 11, wherein said plurality of braces includes a first pair of braces, each of said braces of said first pair of braces being attached to one of said vertical posts, said plurality of braces including a second pair of braces, each of said braces of said second pair of braces being attached to one of said vertical rods.

13. The assembly according to claim 12, wherein each of said braces is angled with respect to a horizontal plane generally between 20 degrees and 70 degrees.

14. A collapsible truck rack assembly for mounting on an upper edge of a perimeter wall attached to a pickup bed, said assembly including:
   a frame including a first side member and a second side member each having a first end and a second end, an end member being attached to and extending between said first ends of said first and second side members, said first and second side members being orientated parallel to each other, a perimeter flange being attached to and extending outwardly from an upper edge of said frame, said flange being positionable on the upper edge of the perimeter wall, a pair of brackets, each of said brackets being attached to and extending upwardly from one of said first and second side members adjacent to said end member;
   a rear support including a pair of vertical posts each having a bottom end and a top end, a horizontal post being attached to and extending between said vertical posts, said horizontal post being positioned nearer to said top ends than said bottom ends, each of said vertical posts having a pair of bends therein such that a distance between said top ends is less than a distance between said bottom ends, an upper portion of said vertical posts positioned between said top ends and said bends being vertically orientated when a lower portion of said vertical posts positioned between said bottom ends and said bends is vertically orientated;
   a front support including a pair of vertical rods each having a lower end and an upper end, a horizontal rod being attached to and extending between said vertical rods, said horizontal rod being positioned nearer to said upper ends than said lower ends, each of said vertical rods having a pair of bends therein such that a distance between said upper ends is less than a distance between said lower ends, an upper portion of said vertical rods positioned between said upper ends and said bends being vertically orientated when a lower portion of said vertical rods positioned between said lower ends and said bends is vertically orientated;
   a horizontal support being attached to said front support and being horizontally orientated when said front support is vertically orientated, said horizontal support including a pair of arms, each of said arms being attached to one of said vertical rods adjacent to said upper ends, each of said arms having a distal end with respect to said vertical rods, a central member being attached to and extending between said distal ends of said arms, said arms being orientated parallel to each other;
   a plurality of couplers configured to releasably couple said front and rear supports to said frame such that said front support is attached to said brackets and said rear support is positioned adjacent to said second ends, each of said couplers including a plate and a fastener, each of said plates being attached to one of said bottom and lower ends, each of two of said fasteners being removably extendable through one of said plates attached to one of said bottom end and into one of said first and second side members adjacent to said second ends, each of two of said fasteners being removably extendable through one of said plates attached to said lower ends and into one of said brackets; and
   a plurality of braces, each of said braces being elongated, each of said braces being removably attached to and extending between one of said front and rear supports and said frame, said plurality of braces including a first pair of braces, each of said braces of said first pair of braces being attached to one of said vertical posts, said plurality of braces including a second pair of braces, each of said braces of said second pair of braces being attached to one of said vertical rods, each of said braces being angled with respect to a horizontal plane generally between 20 degrees and 70 degrees.

* * * * *